United States Patent

Schultz

[15] 3,651,530

[45] Mar. 28, 1972

[54] MEANS FOR CLEANING PIPELINES

[72] Inventor: Ronald W. Schultz, Lodgepole, Alberta, Canada

[22] Filed: Dec. 8, 1970

[21] Appl. No.: 96,187

Related U.S. Application Data

[62] Division of Ser. No. 751,844, Aug. 12, 1968, Pat. No. 3,573,985

[30] Foreign Application Priority Data

Aug. 15, 1967 Canada..................................997884

[52] U.S. Cl. .....................................................15/104.06 R
[51] Int. Cl........................................................B08b 9/04
[58] Field of Search...................15/104.06 R, 104.06 A, 3.5, 15/3.51; 134/8

[56] References Cited

UNITED STATES PATENTS

| | | | |
|---|---|---|---|
| 1,475,431 | 11/1923 | Evans............................. | 15/104.06 R |
| 2,258,174 | 10/1941 | Chawner........................ | 15/104.06 R |
| 2,478,961 | 8/1949 | Wortham........................ | 15/104.06 R |

*Primary Examiner*—Edward L. Roberts
*Attorney*—Millen, Raptes & White

[57] ABSTRACT

A pipeline-cleaning travelling "pig" ball having a generally spherical main body formed of a resiliently deformable material. The main body of the ball is provided with plurality of discrete, discontinuous, spaced-apart protuberances upstanding from the surface thereof; the protuberances being of a hardness greater than that of the main body. Preferably, the protuberances are spaced substantially uniformly over the spherical surface of the main body. The invention also contemplates the provision of a pipeline-cleaning kit comprising a first lead "pig" ball and a second follower pig ball; the second or follower pig ball having a main body formed of a resiliently deformable material having a hardness greater than the hardness of the main body of the first or leading pig ball.

17 Claims, 5 Drawing Figures

Patented March 28, 1972
3,651,530
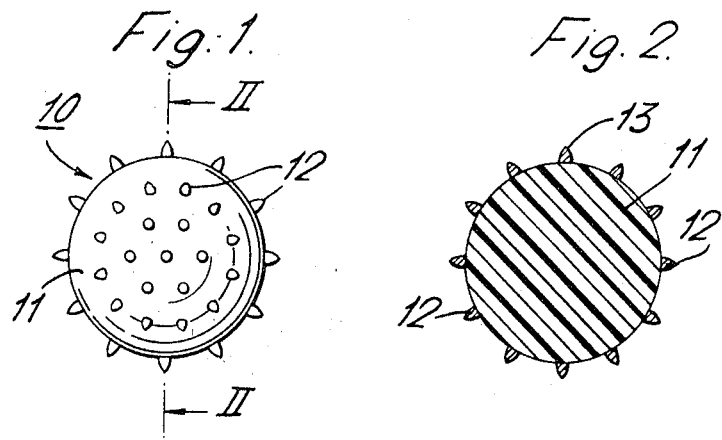
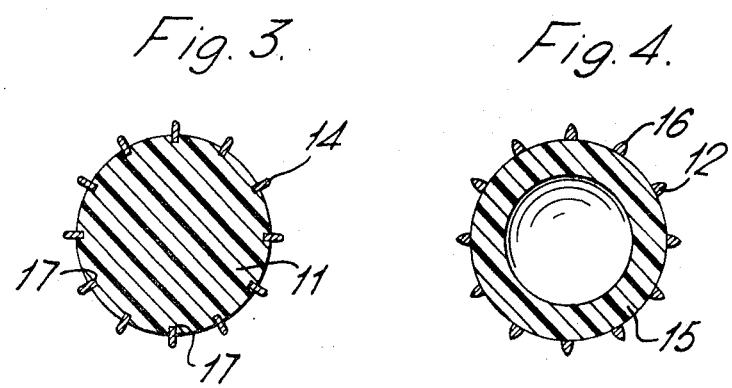
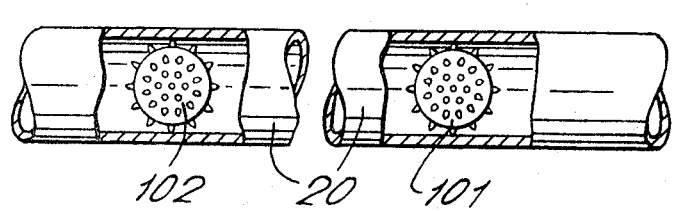
RONALD W. SCHULTZ
INVENTOR
BY Millen, Rapter & White
ATTORNEY

MEANS FOR CLEANING PIPELINES

This application is a division of copending application Ser. No. 751,844 filed Aug. 12, 1968 and now U.S. Pat. No. 3,573,985.

This invention relates to cleaners for pipelines, and in particular to a novel "go-devil" or pig for the cleaning of pipelines.

In industry pipelines are used for conveying fluids under pressure from one place to another and in all cases it is desirable that the flow of fluid should be free and unimpaired, both with regard to volume and also to velocity, and the relationship of these two factors to each other should be fairly constant. In use, these pipelines to a greater or less degree become fouled or partially clogged by a buildup of scale, thereby reducing the effective area of the pipeline and increasing the frictional resistance to the flow of liquid through the pipeline. It thus becomes necessary periodically to clean the pipeline. Among some of the methods used for cleaning such pipelines are the use of acids or other chemicals, sand blasting (if the pipe can be disconnected), or pipeline-cleaning pigs. If such cleaning involves the shutting down of the pipeline and/or the disconnecting of any parts of the pipeline, then the efficiency of the line becomes impaired due to loss of the work hours during which the line is out of commission. The character of the liquid being conveyed through the pipeline may influence the speed and frequency of the fouling of the pipeline, and a heavy and more viscous fluid may tend to foul a pipeline quicker than a light fluid. Whatever be the characteristics of the fluids, it will be appreciated that, unless the pipeline is maintained in proper serviceable condition, then monetary loss in the operation of the pipeline becomes high.

As is now well known, the pipeline transportation industry extensively uses travelling plugs, such as spherical members called pig balls, in pipelines for the purpose of effecting such defouling. One field of general use is in the flow line through which crude oil produced by an oil well is transferred to the tank battery. In certain areas this line becomes coated on the inside with a layer of wax which is deposited by the oil. This layer becomes thicker as the oil continues to flow, and sometimes plugs the flow line completely. By inserting a ball, sometimes referred to as a pig ball, in the line at the well head, the oil pressure will force it through the flow line scraping out the wax ahead of it. The pipeline is often comprised of a plurality of diameter sizes, and it is desirable to inject a sphere or plug at intervals along the pipeline in accordance with the diameter variances therein. Furthermore, since the pipeline may be formed of a plurality of welded-together sections, a slight decrease in internal diameter of the pipeline at a join occurs as a result of the welding bead. Fouling and/or buildup tends to occur at such locations. In the use of these balls which pass through the line along with the liquid travelling in the line, the industry has now provided many kinds of apparatus to launch or inject the spheres into the line and differing schemes to remove the spheres from the lines at predetermined points. As now used in the art, the term pig ball has come to refer to a spherical body of solid or inflatable material, e.g., rubbery material, which cleans out pipelines. The pig ball is forced through the pipeline, cleaning as it travels. Generally, the pig ball has a diameter slightly larger than the internal diameter of the pipeline and acts as a free plunger as it is driven by fluid (liquid or air) pressure through the length of the pipeline.

Pig balls, as now known in the art, may be inflatable, flexible and hollow spheres, or they may be rigid plastic compositions, or flexible, solid spheres. They may be made of a rubbery material such as polychloroprene, commercially available as Neoprene. They may be solid or inflatable, and usually are slightly larger in diameter than the inside diameter of the pipeline to be "pigged".

Pigging a pipeline is a term used to describe an operation wherein a pig ball is inserted into a pipeline for separation of products, or when the pipeline is to be completely emptied of fluid or when removing coated debris from the inner walls of a pipeline. The ball effectively squeegees the pipe walls as it passes through the pipeline. A uniform fluid pressure on one side of the ball moves it forward against inertia and resistance when the ball is properly started on its way into the pipeline.

It is an object of this invention to provide a novel pig ball for the cleaning of pipelines. An object of another aspect of this invention is the provision of a novel kit for the cleaning of pipelines.

In accordance with this invention, a travelling pipeline-cleaning pig ball comprises a generally spherical main body formed of a resiliently deformable material, and provided with a plurality of discrete, discontinuous, spaced-apart protuberances upstanding from its surface. The protuberances are harder than the main body of the ball, and preferably are spaced substantially uniformly over the spherical surface of the main body.

By another aspect of this invention there is provided a kit for the cleaning of pipelines. The kit comprises the combination of (a) a first lead pipeline-cleaning travelling pig ball having a generally spherical main body formed of a resiliently deformable material and provided with a plurality of discrete, discontinuous and spaced apart protuberances upstanding from the surface thereof, said protuberances having a hardness greater than that of said main body, and (b) a second follower pipeline-cleaning travelling pig ball having a generally spherical main body formed of a resiliently deformable material and provided with a plurality of discrete, discontinuous and laterally spaced apart protuberances upstanding from the surface thereof, said protuberances having a hardness greater than that of said main body, and said main body having a hardness greater than the hardness of the main body of said lead pig ball.

It is important that the pig balls be resiliently deformable, but the precise material out of which the pig ball is formed may be selected from a wide variety of substances. The pig ball may be a solid or a hollow plastic or rubber (natural or synthetic) which is of sufficient resiliency as to be able to be forced through a pipeline and to be resiliently deformed by permanent obstructions in the pipeline but be substantially undeformed by temporary obstructions, e.g., scale buildup within the pipeline. Thus, depending on the particular use to which the pig ball may be put and the type of scale within the pipeline, the resiliently deformable material may be a "soft" material, e.g., have a Shore A Durometer hardness of 30 – 50; a "semi-hard" substance, e.g., have a Shore A Durometer hardness of 50 – 100; or a "hard" material, e.g., have a Shore A Durometer hardness above 100. Among the rubbers which may be used and which would be selected to have the appropriate hardness are: natural rubber; butadiene-styrene copolymers (e.g., Buna S); butadiene-acrylonitrile copolymers (e.g., Perbunan, Hycar, Chemigum); polychloroprenes (e.g., Neoprene); isobutylene diolefin copolymers (e.g., Butyl); polysulfide rubbers (e.g., Thiokols, Perdurens); and polybutene rubbers (e.g., Vistanex, polybutene). In addition, some vinyl resins are also useful, (e.g., Koroseal, Flamenol, Igelite, Mipolom, Vinylite V).

A particular embodiment of this invention now will be described, making reference to the drawings which accompany this specification in which:

FIG. 1 is a front elevation view of a pig ball according to this invention.

FIG. 2 is a cross section view taken along the line II—II of FIG. 1.

FIG. 3 is a cross section view similar to that of FIG. 2 but showing an alternative structure of pig ball according to the practice of this invention.

FIG. 4 is a cross section view similar to that of FIGS. 2 and 3, but showing another alternative embodiment of a pig ball of this invention. FIG. 5 is a schematic representation of pig balls of the present invention passing through a pipeline.

The pig balls 10 are provided with a plurality of spaced-apart protuberances upstanding from the surface thereof, which are harder than the main ball. The protuberances 12 are for the purpose of enhancing the cleaning action by knocking, cutting or scraping away sedimentary or other deposits from the inside of the pipeline. While the protuberances 12 should be harder than the main ball, they need not be formed of a different material. Thus, the protuberances 12 may be formed of the same material (chemically) but having the necessary degree of hardness. The protuberances, if formed of the resiliently deformable material 11, should be provided with hard metal tips 13. Alternatively, the protuberances may be formed of hard metal 16 suitably secured to the spherical surface of the main ball which, as shown in FIG. 4, is a hollow resiliently deformable ball 15. They may, for example, be in the form of lugs to knock sedimentary deposits from the inside of the pipeline. They also may be sharpened to function as scrapers or cutters to clean the pipeline of such deposits.

One preferred type of protuberance is tungsten carbide studs 14 (FIG. 3). The studs are generally embedded in holes 17 drilled in the resiliently deformable ball 11.

FIG. 5 shows a pipeline 20 being cleaned utilizing pig balls in accordance with this invention. The pipeline 20 is provided with the usual control valves (not shown) and with a conventional means well known to those skilled in the art for injecting pig balls into the pipeline 20 and for removing the pig balls after they have traversed the portion of the pipeline to be cleaned. A pig ball 101 is injected into the pipeline 20 by conventional means, and is propelled along the pipeline by the fluid pressure therewithin. After a predetermined interval of time, a second pig ball 102 is similarly injected into the pipeline and both pig balls 101 and 102 are propelled along the pipeline 20 by fluid pressure, the pig balls remaining in spaced-apart relation. If desired, additional pig balls (not shown) may be injected into the pipeline 20. After each pig ball has traversed the portion of the pipeline 20 to be cleaned, it is removed by conventional means and the loosened sediment and other fouling material is also withdrawn.

There is no criticality in the disposition of the protuberances on the surface of the ball. Thus, they may be more or less equidistantly spaced, or they may be fairly densely arrayed and offset to have an irregular pattern. Generally, having a protuberance at every one-half square inch of the surface is satisfactory. The protuberances are generally one-fourth to three-eighth inches high, i.e., they extend outwardly by that amount from the surface.

In one example, a pipeline three-fourths mile long and having a nominal internal diameter of 3 inches, was cleaned utilizing the pig balls of this invention. The first or lead pig ball was a solid ball formed of Neoprene provided with a plurality of tungsten carbide protuberances spaced at ½ inch centers. It had a Shore A Durometer hardness of 50 and an external diameter of 3 inches. The second or follower pig ball was a solid ball formed of Hycar. It too was provided with a plurality of tungsten carbide protuberances spaced at ½ inch centers, but it had a Shore A Durometer hardness of 50 and an external diameter of 3 inches. An applied force of 50 p.s.i. was required to propel the pig balls through the pipeline so as to clean the line. For a pipeline 2 miles long, using the same pig balls, a force of 80 p.s.i. was required. This compares favorably with the sand blast technique, where, for a pipeline 2 miles long, a force of 800 – 1,200 p.s.i. created by a 2 hp. motor is needed.

I claim:

1. A pipeline-cleaning travelling pig ball having a generally spherical main body formed of a resiliently deformable material, and provided with a plurality of discrete, discontinuous, spaced-apart protuberances upstanding from the surface thereof, said protuberances having a hardness greater than that of the main body.

2. A pipeline-cleaning ball as defined in claim 1 wherein said protuberances are spaced substantially uniformly over the surface of the main body.

3. A pipeline-cleaning ball as defined in claim 2 wherein the resiliently deformable material is natural or synthetic rubber.

4. A pig of claim 3 wherein the rubber has a Shore A Durometer hardness of 30 to 100.

5. The pig of claim 2 wherein the protuberances are formed of a material different from that of the main body.

6. The pig of claim 5 wherein said protuberances are provided with hard metal tips.

7. The pig of claim 5 wherein said protuberances are formed of hard metal.

8. The pig of claim 7 wherein the hard metal protuberances are attached to the surface of the main body.

9. The pig of claim 5 wherein the protuberances are formed of or provided with tips of tungsten carbide.

10. The pig of claim 9 wherein the resiliently deformable material of the main body is natural or synthetic rubber.

11. A kit for cleaning pipeline comprising the combination of:
   a. a first lead pipeline-cleaning travelling pig ball having a generally spherical main body formed of a resiliently deformable material and provided with a plurality of discrete, discontinuous and spaced apart protuberances having a hardness greater than that of said main body, and
   b. a second follower pipeline-cleaning travelling pig ball having a generally spherical main body formed of a resiliently deformable material and provided with a plurality of discrete, discontinuous and laterally spaced apart protuberances upstanding from the surface thereof, said protuberances having a hardness greater than that of said main body, and said main body having a hardness greater than the hardness of the main body of said lead pig ball.

12. A pipeline cleaning kit as defined in claim 11 wherein the resiliently deformable material forming the main body of said first lead pig ball is a natural or synthetic rubber having a Shore A Durometer hardness between 30 and 50, and wherein the resiliently deformable material forming the main body of said second follower pig ball is a natural or synthetic rubber having a Shore A Durometer hardness between 50 and 100.

13. A pipeline cleaning kit as defined in claim 11 wherein the resiliently deformable material forming the main body of said first lead pig ball is a natural or synthetic rubber having a Shore A Durometer hardness between 30 and 50, and wherein the resiliently deformable material forming the main body of said second follower pig ball is a natural or synthetic rubber having a Shore A Durometer hardness greater than 100.

14. A pipeline cleaning kit as defined in claim 11 wherein the resiliently deformable material forming the main body of said first lead pig ball is a natural or synthetic rubber having a Shore A Durometer hardness between 50 and 100, and wherein the resiliently deformable material forming the main body of said second follower pig ball is a natural or synthetic rubber having a Shore A Durometer hardness greater than 100.

15. A pipeline cleaning kit as defined in claim 11 wherein said protuberances on said travelling pig balls are formed of metal.

16. A pipeline cleaning kit as defined in claim 15 wherein said protuberances are provided with hard metallic tips.

17. A pipeline cleaning kit as defined in claim 16 wherein said protuberances have tips formed of tungsten carbide.

* * * * *